US010560939B2

(12) United States Patent
Jung et al.

(10) Patent No.: US 10,560,939 B2
(45) Date of Patent: Feb. 11, 2020

(54) USER TERMINAL DEVICE AND CONTROL METHOD THEREFOR

(71) Applicant: SAMSUNG ELECTRONICS CO., LTD., Suwon-si (KR)

(72) Inventors: Kyung-hun Jung, Seoul (KR); Ho-sang Sung, Yongin-si (KR); Eun-mi Oh, Seoul (KR); Jong-hoon Jeong, Hwaseong-si (KR); Ki-hyun Choo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 15/778,680

(22) PCT Filed: Nov. 24, 2016

(86) PCT No.: PCT/KR2016/013645
§ 371 (c)(1),
(2) Date: May 24, 2018

(87) PCT Pub. No.: WO2017/091014
PCT Pub. Date: Jun. 1, 2017

(65) Prior Publication Data
US 2018/0359754 A1 Dec. 13, 2018

(30) Foreign Application Priority Data
Nov. 24, 2015 (KR) .................. 10-2015-0164585

(51) Int. Cl.
*H04W 72/04* (2009.01)
*H04W 76/10* (2018.01)
(Continued)

(52) U.S. Cl.
CPC ....... *H04W 72/0453* (2013.01); *H04W 28/20* (2013.01); *H04W 76/10* (2018.02); *H04W 88/04* (2013.01)

(58) Field of Classification Search
None
See application file for complete search history.

(56) References Cited

U.S. PATENT DOCUMENTS 6,301,246 B1 10/2001 Shaffer et al.
7,653,350 B2 * 1/2010 Camp, Jr. ......... H04M 1/72502
455/41.2
(Continued)

FOREIGN PATENT DOCUMENTS

EP 1148660 B1 12/2009
JP 201331812 A 2/2013
(Continued)

OTHER PUBLICATIONS

Communication dated Sep. 6, 2018 issued by the European Patent Office in Counterpart European Application No. 16868910.7.
(Continued)

*Primary Examiner* — Jamaal Henson
(74) *Attorney, Agent, or Firm* — Sughrue Mion, PLLC

(57) ABSTRACT

Disclosed are a user terminal device and a control method therefor. The control method for a user terminal device according to the present invention comprises the steps of: determining state information of a satellite device connected with a user terminal device when a call request message is received from another terminal device; determining communication configuration information with the another terminal device on the basis of the state information of the satellite device, and transmitting a call response message including the communication configuration information to the another terminal device; and receiving audio data from the another terminal device according to a communication
(Continued)

scheme corresponding to the communication configuration information. Therefore, in comparison with the prior art, the present invention can reduce a call negotiation time between user terminal devices, and thus reduce a call cost.

14 Claims, 11 Drawing Sheets

(51) Int. Cl.
*H04W 28/20* (2009.01)
*H04W 88/04* (2009.01)

(56) References Cited

U.S. PATENT DOCUMENTS

| | | | |
|---|---|---|---|
| 7,773,581 B2* | 8/2010 | Punj | H04L 12/1813 348/14.01 |
| 9,565,285 B2* | 2/2017 | Theverapperuma | H04W 4/80 |
| 2006/0025073 A1 | 2/2006 | Benco et al. | |
| 2008/0144645 A1* | 6/2008 | Russell | H04L 47/10 370/412 |
| 2009/0006533 A1* | 1/2009 | Guo | H04L 65/1046 709/203 |
| 2009/0279722 A1* | 11/2009 | Lin | H04R 5/04 381/311 |
| 2011/0053507 A1 | 3/2011 | Choi | |
| 2012/0106451 A1* | 5/2012 | Enstrom | H04W 36/385 370/328 |
| 2013/0095757 A1* | 4/2013 | Abdelsamie | H04W 4/50 455/41.1 |
| 2013/0230057 A1* | 9/2013 | Hori | H04W 76/10 370/466 |
| 2014/0161031 A1 | 6/2014 | Grunert et al. | |

FOREIGN PATENT DOCUMENTS

| | | |
|---|---|---|
| JP | 2014165510 A | 9/2014 |
| KR | 1020090082688 A | 7/2009 |
| KR | 1020110024465 A | 3/2011 |
| KR | 1020110125162 A | 11/2011 |
| KR | 1020140058225 A | 5/2014 |
| WO | 2010145807 A2 | 12/2010 |

OTHER PUBLICATIONS

"3rd Generation Partnership Project; Technical Specification Group Services and System Aspects; IP Multimedia Subsystem (IMS); Multimedia Telephony; Media handling and interaction"; 3GPP TS 26.114 V12.6.0, Release 12, Jun. 2014, pp. 1-311, XP050774124.
Samsung Electronics Co., Ltd., et al., "Basic SDP Parameters of EVS", 3GPP SA4#80, Aug. 2014, pp. 1-8, XP050839839.
"3rd Generation Partnership Project; Technical Specification Group Services and System Aspects; IP Multimedia Subsystem (IMS); Multimedia Telephony; Media handling and interaction"; 3GPP TS 26.114 V12.9.0, Release 12, Mar. 2015, Total 308 pages.
International Search Report dated Jan. 26, 2017, issued by the International Searching Authority in counterpart International Application No. PCT/KR2016/013645 (PCT/ISA/210).
Written Opinion dated Jan. 26, 2017, issued by the International Searching Authority in counterpart International Application No. PCT/KR2016/013645 (PCT/ISA/237).

* cited by examiner

USER TERMINAL DEVICE AND CONTROL METHOD THEREFOR

TECHNICAL FIELD

Apparatuses and methods consistent with the present disclosure relates to a user terminal device and a control method therefor, and more particularly, to a user terminal device for call negotiation between user terminal devices, and a control method therefor.

BACKGROUND ART

In general, when a session for call negotiation between user terminal devices is connected, it is possible to transmit and receive voice data using a communication method requested by a user terminal device requesting call negotiation and agreed by the other user terminal device or a communication method requested by the other user terminal device and agreed by the user terminal device requesting the call negotiation.

DISCLOSURE

Technical Problem

The present disclosure provides transmitting and receiving voice data between user terminal devices in consideration of characteristics of a satellite device communicatively connected to at least one user terminal device.

The present disclosure further provides transmitting and receiving voice data between user terminal devices in consideration of characteristics of a satellite device communicatively connected to at least one user terminal device thereby preventing unnecessary waste of wireless communication resources.

The present disclosure further provides reducing a call negotiation time between user terminal devices thereby reducing a call cost.

Technical Solution

According to an aspect of the present disclosure, a control method of a user terminal device includes when a call request message is received from another terminal device, determining state information of a satellite device connected to the user terminal device; determining communication configuration information with the other terminal device based on the state information of the satellite device and transmitting a call response message comprising the communication configuration information to the other terminal device; and receiving voice data from the other terminal device using a communication method corresponding to the communication configuration information.

The transmitting may include: when it is determined based on the state information of the satellite device that the satellite device performs communication with the user terminal device through a communication configuration of a first bandwidth, transmitting the call response message including communication configuration information for the other terminal device to transmit the voice data in the first bandwidth to the other terminal device, and wherein the receiving includes: receiving the voice data from the other terminal device through the first bandwidth.

The transmitting may further include: when communication is requested through a second bandwidth greater than the first bandwidth to a call request message received from the other terminal device, transmitting the call response message further including communication configuration information for the other terminal device to receive the voice data in the second bandwidth to the other terminal device and transmitting the voice data to the other terminal device through the second bandwidth according to the communication configuration information.

The transmitting of the voice data may include: receiving the voice data from the satellite device through the first bandwidth; amplifying a band of the received voice data to the second bandwidth; and transmitting the amplified voice data to the other terminal device through the second bandwidth.

The transmitting may further include: when communication is requested through a second bandwidth greater than the first bandwidth to a call request message received from the other terminal device, transmitting the call response message further including communication configuration information for the other terminal device to receive the voice data in the first bandwidth to the other terminal device and transmitting the voice data received from the satellite device to the other terminal device through the first bandwidth.

The control method may further include: determining a connection state between the user terminal device and the satellite device; and when it is determined that a connection between the user terminal device and the satellite device is released, transmitting an event occurrence message including communication configuration information for the user terminal device and the other terminal device to transmit and receive the voice data in the second bandwidth to the other terminal device, and wherein the receiving includes: receiving the voice data from the other terminal device through the second bandwidth.

The transmitting of the event occurrence message may include: when the user terminal device and the satellite device are connected in a state where the voice data is transmitted and received to and from the other terminal device through the second bandwidth, transmitting the event occurrence message including communication configuration information for the other terminal device to transmit the voice data in the first bandwidth to the other terminal device, and wherein the receiving includes: receiving the voice data from the other terminal device through the first bandwidth.

According to another aspect of the present disclosure, a control method of a user terminal device includes transmitting a call request message to another terminal device, receiving a call response message including communication configuration information determined based on state information of a satellite device connected to the other terminal device from the other terminal device and transmitting voice data to the other terminal device in a communication method corresponding to the communication configuration information.

The transmitting of the other terminal device may include, when it is determined that the other terminal device has requested transmission of the voice data in a first bandwidth based on the communication configuration information, transmitting the voice data to the other terminal device through the first bandwidth.

The control method may further include receiving the voice data from the other terminal device and transmitting the voice data to the satellite device when it is determined that the user terminal device is connected to the satellite device, wherein the transmitting of the voice data to the satellite device includes transmitting the voice data through a bandwidth that may be communicated by the satellite device based on the state information of the satellite device.

The transmitting of the voice data to the other terminal device may include, when the voice data is received from the satellite device through a second bandwidth greater than the first bandwidth, transmitting the voice data to the other terminal device through the first bandwidth based on the communication configuration information included in the call response message.

The transmitting of the voice data to the other terminal device may include, when an event occurrence message is received from the other terminal device, transmitting the voice data in a bandwidth requested by the other terminal device according to communication configuration information included in the event occurrence message.

According to another aspect of the present disclosure, a user terminal device includes: a first communicator configured to perform data communication with another terminal device; a second communicator configured to perform data communication with a satellite device connected to the user terminal device; a storage configured to store state information of the satellite device; and a controller configured to, when a call request message is received from the other terminal device through the first communicator, control the first communicator to determine communication configuration information of the other terminal device based on the state information of the satellite device stored in the storage, generate a call response message comprising the communication configuration information, and transmit the call response message to the other terminal device, and wherein the first communicator is configured to receive the voice data from the other terminal device in a communication method corresponding to the communication configuration information.

The controller may be configured to, when it is determined based on the state information of the satellite device that the satellite device performs communication with the user terminal device through a communication configuration of a first bandwidth, generate the call response message including communication configuration information for the other terminal device to transmit the voice data in the first bandwidth to the other terminal device, and wherein the first communicator is configured to receive the voice data from the other terminal device through the first bandwidth.

The controller may be configured to, when communication is requested through a second bandwidth greater than the first bandwidth to a call request message received from the other terminal device, control the first communicator to generate the call response message further including communication configuration information for the other terminal device to receive the voice data in the second bandwidth to the other terminal device and transmit the voice data to the other terminal device through the second bandwidth according to the communication configuration information.

The controller may be configured to, when the voice data is received from the satellite device through the first bandwidth, control the first communicator to amplify a band of the received voice data to the second bandwidth and transmit the amplified voice data to the other terminal device through the second bandwidth.

The controller may be configured to, when communication is requested through a second bandwidth greater than the first bandwidth to a call request message received from the other terminal device, control the first communicator to transmit the call response message further including communication configuration information for the other terminal device to receive the voice data in the first bandwidth to the other terminal device and, when the voice data is received from the satellite device, transmit the voice data to the other terminal device through the first bandwidth according to the communication configuration information.

The controller may be configured to, when it is determined that a connection between the user terminal device and the satellite device is released, control the first communicator to generate an event occurrence message including communication configuration information for the user terminal device and the other terminal device to transmit and receive the voice data in the second bandwidth and transmit the event occurrence message to the other terminal device, and wherein the first communicator is configured to receive the voice data from the other terminal device through the second bandwidth after transmitting the event occurrence message.

The controller may be configured to, when the user terminal device and the satellite device are connected in a state where the voice data is transmitted and received to and from the other terminal device through the second bandwidth, control the first communicator to transmit the event occurrence message including communication configuration information for the other terminal device to transmit the voice data in the first bandwidth to the other terminal device, and wherein the first communicator is configured to receive the voice data from the other terminal device through the first bandwidth after transmitting the event occurrence message.

According to another aspect of the present disclosure, a user terminal device includes a first communicator configured to perform data communication with another terminal device, and a controller configured to, when a call response message including communication configuration information determined based on state information of a satellite device connected to the other terminal device is received from the other terminal device through a first communicator, control the first communicator to transmit voice data to the other terminal device in a communication method corresponding to the communication configuration information.

When it is determined that the other terminal device has requested communication in a first bandwidth based on the communication configuration information, the controller may control the first communicator to transmit the voice data to the other terminal device through the first bandwidth.

The user terminal device may further include a second communicator configured to perform data communication with the satellite device connected to the user terminal device, and a storage configured to store the state information of the satellite device, wherein the controller is configured to control, when the voice data is received from the other terminal device, the second communicator to transmit the voice data through a bandwidth that may be communicated by the satellite device based on the state information of the satellite device stored in the storage.

The controller is configured to control, when the voice data is received from the satellite device through a second bandwidth greater than the first bandwidth, the first communicator to transmit the voice data to the other terminal device through the first bandwidth based on the communication configuration information included in the call response message.

The controller is configured to control, when an event occurrence message is received from the other terminal device, the first communicator to transmit the voice data in a bandwidth requested by the other terminal device according to communication configuration information included in the event occurrence message.

According to another embodiment of the present invention, a control method of a user terminal device includes performing call negotiation with another terminal device; and transmitting and receiving voice data to and from the other terminal device based on the call negotiation, wherein the performing includes transmitting a message including communication configuration information determined based on state information of a satellite device connected to the user terminal device to the other terminal device to perform call negotiation with the other terminal device.

Advantageous Effects

According to the diverse exemplary embodiments of the present disclosure, it is possible to reduce a call negotiation time between user terminal devices in comparison with the prior art, thereby reducing a call cost. Furthermore, the present disclosure may transmit voice data in consideration of a communication method of a satellite device communicably connected to at least one user terminal device, thereby improving not only the problem of unnecessary waste of wireless communication resources but also the problem of an occurrence of degradation of a call quality.

BEST MODE

Figure 1:
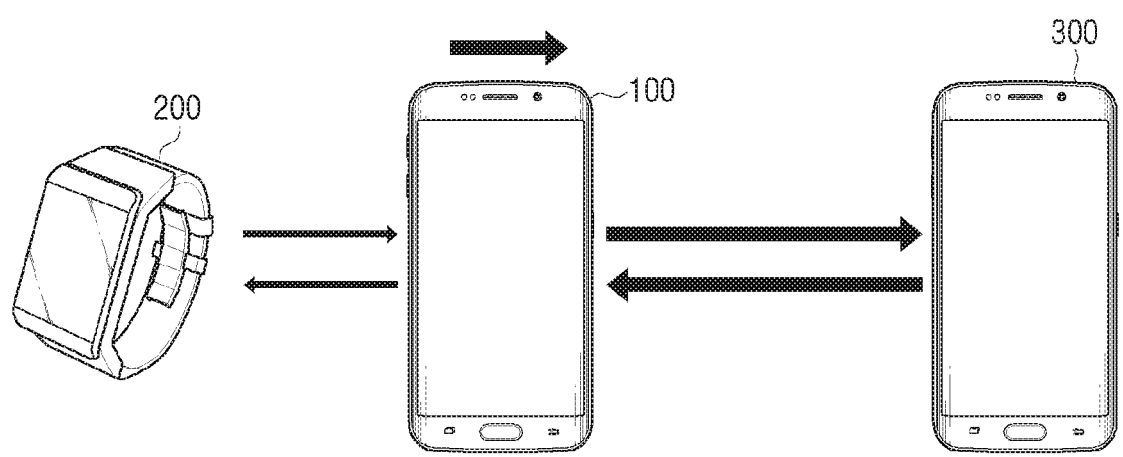
FIG. 1 is a diagram illustrating data communication between user terminal devices according to an exemplary embodiment of the present disclosure.

Hereinafter, exemplary embodiments of the present disclosure will be described in more detail with reference to the accompanying drawings. In describing the present disclosure, when it is decided that a detailed description for the known functions or configurations related to the present disclosure may unnecessarily obscure the gist of the present disclosure, the detailed description therefor will be omitted.

Before describing the present disclosure in detail, a method of describing the present specification and drawings will be described.

Although general terms used in the present specification and claims are selected to describe exemplary embodiments in consideration of the functions thereof, these general terms may vary according to intentions of one of ordinary skill in the art, legal or technical interpretation, the advent of new technologies, and the like. Some terms are arbitrarily selected by the applicant of the exemplary embodiments. These terms may be construed in the meaning defined herein and, unless otherwise specified, may be construed on the basis of the entire contents of this specification and common technical knowledge in the art.

Also, the same reference numerals or signs as used in the accompanying drawings denote parts or components performing substantially the same function. For ease of explanation and understanding, different embodiments will be described using the same reference numerals or signs. In other words, even though all the elements having the same reference numerals are shown in a plurality of drawings, the plurality of drawings do not mean one embodiment.

Also, in the present specification and claims, terms including an ordinal number such as "first", "second", etc. may be used for distinguishing between components. These ordinals are used to distinguish between the same or similar components, and the use of such ordinals should not be construed as limiting the meaning of the term. For example, the components associated with such an ordinal number should not be limited in the order of use, placement order, or the like. If necessary, each ordinal number may be used interchangeably.

As used herein, the singular forms "a", "an" and "the" include plural referents unless the context clearly dictates otherwise. In the present application, the terms "include" or "configured" and the like, specify the presence of a feature, a number, a step, an operation, a component, parts, or a combination thereof but do not preclude the presence or addition of one or more features, numbers, steps, operations, components, parts, or combinations thereof.

In the embodiments of the present disclosure, the terms such as "module," "unit," "part," and the like are terms for designating a component that performs at least one function or operation. The component may be implemented as hardware, software, or a combination of hardware and software. A plurality of "modules", "units", "parts", etc. may be integrated into at least one module or chip and implemented as at least one processor (not shown), excluding the case where each is necessarily implemented as individual specific hardware.

Further, in an embodiment of the present disclosure, when a part is connected to another part, this includes not only a direct connection but also an indirect connection through another medium. Also, the meaning that a part includes an element does not exclude other elements, but may include other elements, unless specifically stated otherwise.

Hereinafter, various embodiments of the present disclosure will be described in detail with reference to the accompanying drawings.

FIG. 1 is a diagram illustrating data communication between user terminal devices according to an exemplary embodiment of the present disclosure.

As shown in FIG. 1, a user may perform a voice call with a user of a second user terminal device 300 through a satellite device 200 connected to a first user terminal device 100 owned by the user using a short-range wireless communication method.

As shown in FIG. 1, the first user terminal device 100 connected to the satellite 200 using the short-range wireless communication method may transmit a call request message to the second user terminal device 300 according to a user request.

In this case, the first user terminal device 100 may determine communication configuration information with the second user terminal device 300 based on state information of the satellite device 200 connected using the short-range wireless communication method, and transmit the call request message including the determined communication configuration information.

Specifically, when the first user terminal device 100 is communicatively connected to the satellite device 200, the first user terminal device 100 may receive and store satellite device information including identification information of the satellite device 200 and the state information of a communication method that may be supported by the satellite device 200 from the communicatively connected satellite device 200. Accordingly, when a user instruction for voice communication with the second user terminal device 300 is input, the first user terminal device 100 may determine the communication configuration information for voice-related data communication with the second user terminal device 300 based on the pre-stored satellite device information and a communication method that may be supported by the first user terminal device 100.

However, the present disclosure is not limited thereto. When the user instruction for voice communication with the second user terminal device 300 is input, the first user terminal device 100 may receive the state information of a communication method that may be supported by the satellite device 200 from the satellite device 200 communicatively connected to the first user terminal device 100.

When the state information of the satellite device 200 is received, the first user terminal device 100 may determine the communication configuration information for voice-related data communication with the second user terminal device 300 based on the received state information and the communication method that may be supported by the first user terminal device 100.

For example, the satellite device 200 may perform data communication in a wideband, and the first user terminal device 100 may perform data communication in a super wide band (SWB). In this case, the first user terminal device 100 may transmit voice data to the second user terminal device 300 through the SWB, determine the communication configuration information for receiving the voice data from the second user terminal device 300 through the wideband, and transmit the call request message including the determined communication configuration information to the second user terminal device 300.

The second user terminal device 300 that received the call request message may transmit a call response message to the first user terminal device 100. Accordingly, when a session for transmitting and receiving the voice data between the first and second user terminal devices 100 and 300 is connected, the first user terminal device 100 may amplify a band of the voice data received from the satellite device 200 through a bandwidth of the wideband and transmits it to the second user terminal device 300 through a bandwidth of the SWB. On the other hand, the second user terminal device 300 may transmit the voice data to the first user terminal device 100 through the bandwidth of the wideband based on the communication configuration information included in the call request message, and the first user terminal device 100 may transmit the voice data of the SWB from the second user terminal device 300 to the satellite device 200 communicatively connected to the first user terminal device 100.

On the other hand, the second user terminal device 300 receiving the call request message including the communication configuration information may be impossible to perform data communication through the SWB. For example, when the second user terminal device 300 is capable of data communication through the wideband, the second user terminal device 300 may transmit the call request message including the communication configuration information for receiving the voice data through the wideband to the first user terminal device 100.

Accordingly, the first user terminal device 100 may transmit the voice data received from the satellite device 200 to the second user terminal device 300 through the bandwidth of the wideband based on the communication configuration information included in the call response message received from the second user terminal device 300.

As described above, the first user terminal device 100 according to the present disclosure may transmit the call request message to the second user terminal device 300 in consideration of the communication method of the satellite device 200 communicatively connected to the first user terminal device 100, thereby improving not only the problem of unnecessary waste of wireless communication resources but also the problem of an occurrence of degradation of a call quality.

In addition, the first user terminal device 100 communicatively connected to the satellite apparatus 200 according to the present disclosure may initiate a call negotiation with the satellite device 200 communicatively coupled to the first user terminal device 100 at the time of receiving the call response message from the second user terminal device 300 that transmitted the call request message, thereby reducing a call negotiation time compared with the conventional, and reducing a call cost accordingly.

Figure 2:
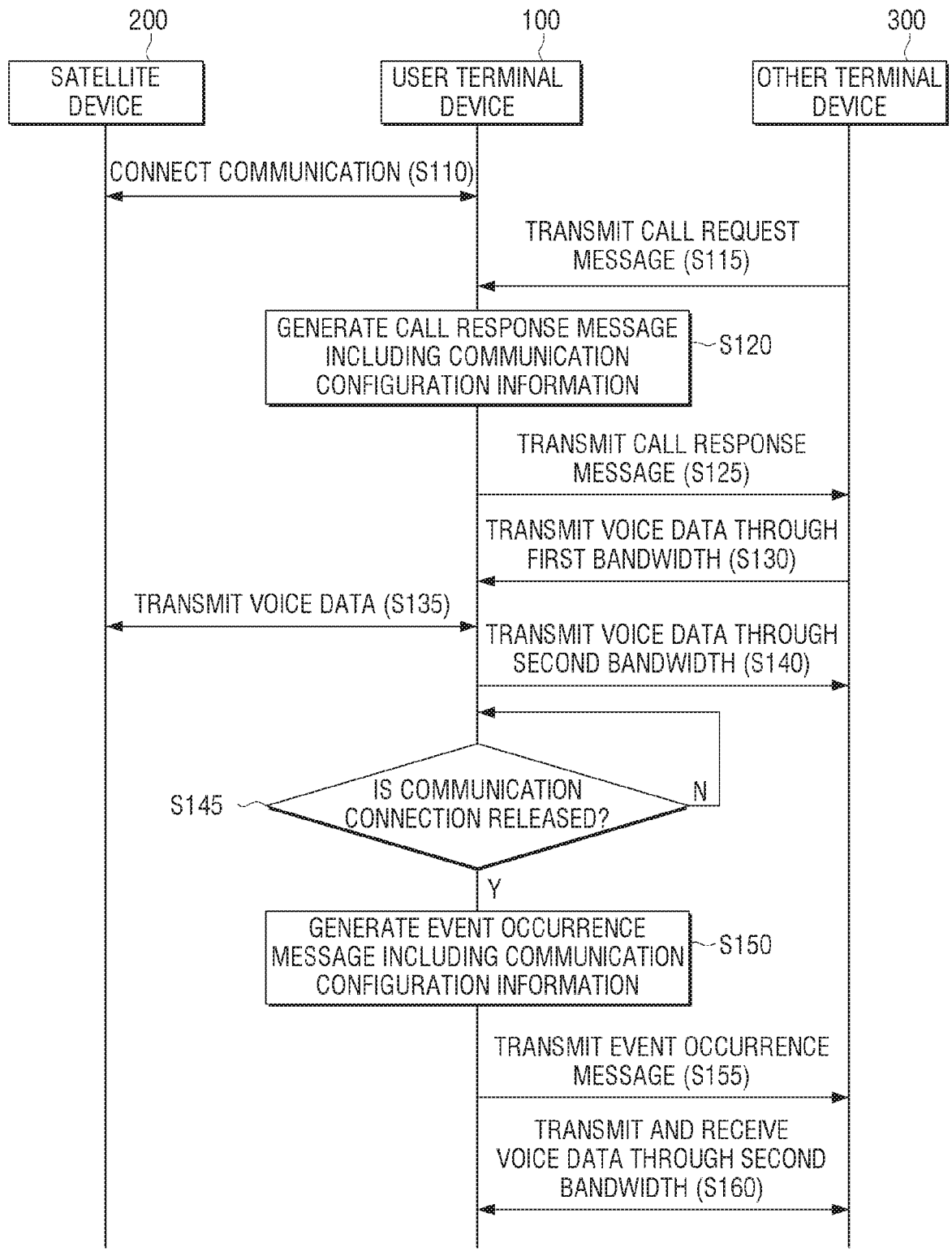
FIG. 2 is a first flow block diagram of performing data communication between user terminal devices according to an exemplary embodiment of the present disclosure.

FIG. 2 is a first flowchart of performing data communication between user terminal devices according to an exemplary embodiment of the present disclosure.

As shown in FIG. 2, the first user terminal device 100 may be communicatively connected to the satellite device 200 such as a smart watch using a short-range wireless communication method according to a user instruction (S110). The first user terminal device 100 may store satellite device information received from the satellite device 200 as communicatively connected to the satellite device 200. Here, the satellite device information may include at least one of identification information of the satellite device 200 and state information of a communication method that may be supported by the satellite device 200.

On the other hand, the other terminal device (hereinafter referred to as the second user terminal device) 300 may transmit a call request message to the first user terminal device 100 according to a user request of the second user terminal device 300 (S115).

When the call request message is received, the first user terminal device 100 determines communication configuration information for voice-related data communication with second user terminal device 300 based on the state information included in the pre-stored satellite device information and the communication method that may be supported by the satellite device 200 in the first user terminal device 100. Here, the communication configuration information may be information for receiving voice data from the second user terminal device 300 in a first bandwidth corresponding to the communication method that may be supported by the satellite device 200, and transmitting the voice data in a second bandwidth corresponding to a communication method that may be supported by the first user terminal device 100.

When the communication configuration information is determined, a call response message including the determined communication configuration information is generated and transmitted to the second user terminal device 300 (S120 and S125).

Accordingly, a session for call negotiation may be connected between the first user terminal device 100 and the second user terminal device 300. When the session for call negotiation is connected, the second user terminal device 300 transmits the voice data through the first bandwidth based on the communication configuration information included in the call response message received from the first user terminal device 100 (S130). Here, the first bandwidth is the communication method that may be supported by the satellite device 200 communicatively connected to the first user terminal device 100. Accordingly, the first user terminal device 100 transmits the voice data received from the second user terminal device 300 to the satellite device 200 without modulating the communication method supported by the satellite device 200 (S135).

On the other hand, in step S135, the satellite device 200 may transmit voice data of a user's uttered voice to the first user terminal device 100 through the first bandwidth. When the voice data is received from the satellite device 200, the first user terminal device 100 amplifies the voice data received from the satellite device 200 based on the communication configuration information previously generated through step S120, and transmits a band of the amplified voice data to the second user terminal device 300 through the second bandwidth (S140).

The first and second user terminal devices 100 and 300 may repeat steps S130 to S140 described above until a session connection for call negotiation is released. Meanwhile, the first user terminal device 100 determines whether a communication connection with the satellite device 200 is periodically disconnected in a state where the session with the second user terminal device 300 is connected (S145). That is, the first user terminal device 100 may determine whether the communication connection with the satellite device 200 is released until the session connection with the second user terminal device 300 is released. As a result of determination, when it is determined that the communication connection with the satellite device 200 is released, the first user terminal device 100 generates an event occurrence message including the communication configuration information and transmits the event occurrence message to the second user terminal device 300 (S150, S155).

Here, the communication configuration information may be information for transmitting and receiving the voice data in the second bandwidth corresponding to the communication method that may be supported by the first user terminal device 100. Accordingly, when the second user terminal device 300 receives the event occurrence message from the first user terminal device 100, the second user terminal device 300 transmits the voice data through the second bandwidth based on the communication configuration information included in the received event occurrence message. That is, when an event that the communication connection with the satellite device 200 is released occurs, the first and second user terminal devices 100 and 300 transmit and receive the voice data through the second bandwidth based on the communication configuration information included in the event occurrence message (S160).

Figure 3:
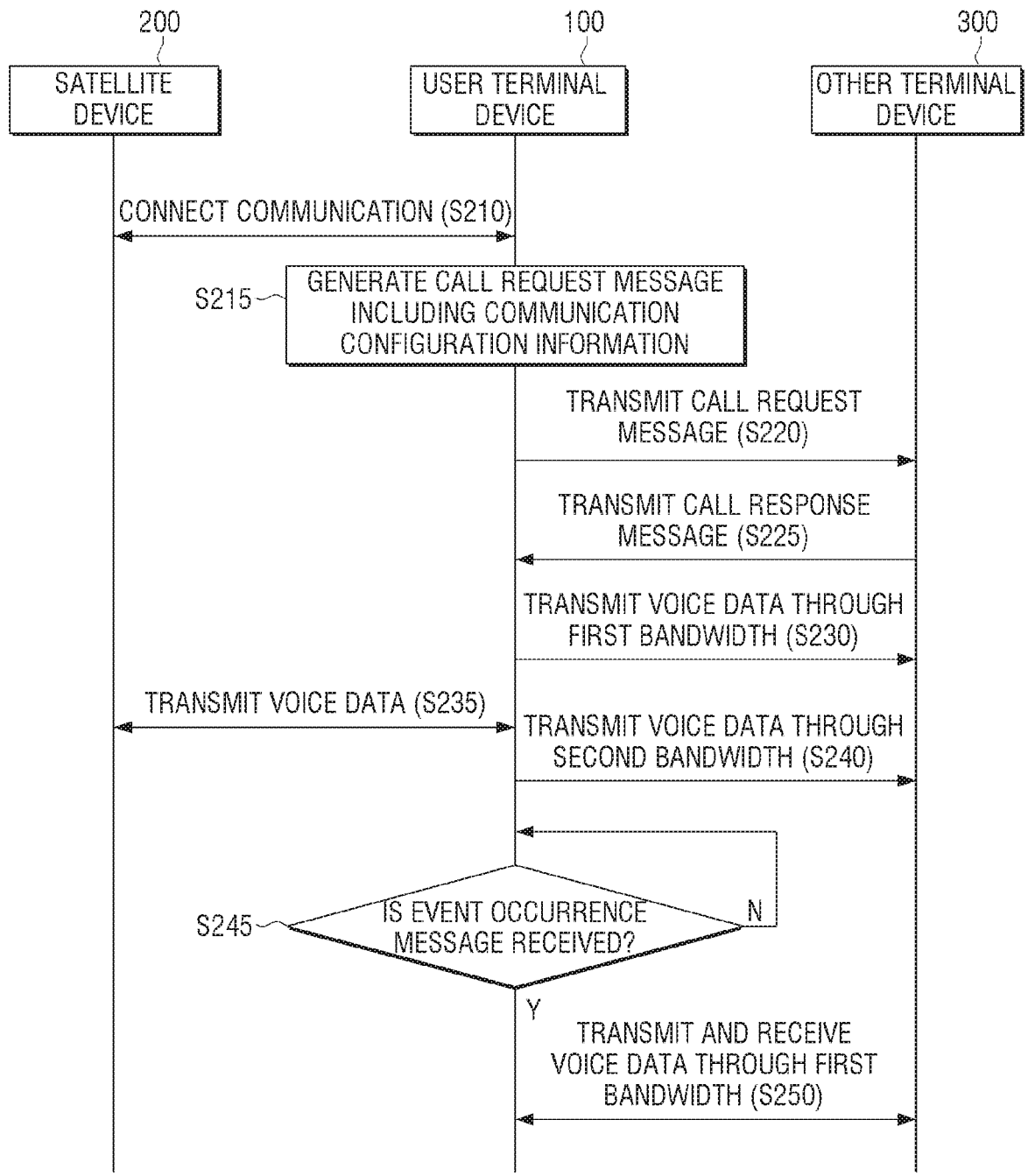
FIG. 3 is a second flow block diagram for performing data communication between user terminal devices according to another exemplary embodiment of the present disclosure.

FIG. 3 is a second flow block diagram for performing data communication between user terminal devices according to another exemplary embodiment of the present disclosure.

As shown in FIG. 3, the first user terminal device 100 is communicatively connected to the satellite device 200 such as a smart watch using a short-range wireless communication method according to a user instruction (S210). The first user terminal device 100 may store satellite device information received from the satellite device 200 as communicatively connected to the satellite device 200. Here, the satellite device information may include at least one of identification information of the satellite device 200 and state information of a communication method that may be supported by the satellite device 200.

When a user instruction for call negotiation with the second user terminal device 300 is input in a state where the first user terminal device 100 is communicatively connected to the satellite device 200, the first user terminal device 100 generates a call response message including communication configuration information and transmits the call response message to the second user terminal device 300 (S215, S220).

Specifically, the first user terminal device 100 determines communication configuration information for voice-related data communication with second user terminal device 300 according to a user request based on the state information included in the pre-stored satellite device information and the communication method that may be supported by the satellite device 200 in the first user terminal device 100. Here, the communication configuration information may be information for receiving voice data from the second user terminal device 300 in a first bandwidth corresponding to the communication method that may be supported by the satellite device 200, and transmitting the voice data in a second bandwidth corresponding to a communication method that may be supported by the first user terminal device 100.

When the communication configuration information is determined, a call request message including the determined communication configuration information is generated and transmitted to the second user terminal device 300. The second user terminal device 300 transmits a call response message to the first user terminal device 100 based on the call request message received from the first user terminal device 100 (S225). Here, the call response message may include the communication configuration information for receiving voice data in a communication method that may be supported by the second user terminal device 300.

However, the present disclosure is not limited thereto, and when the second user terminal device 300 refers to the communication configuration information included in the call request message and determines that the response message is received in the communication method that may be supported by the second user terminal device 300, the second user terminal device 300 may transmit the call response message for call negotiation with the first user terminal device 100 to the first user terminal device 100 without additional communication configuration information.

A session for call negotiation may be connected between the first user terminal device 100 and the second user terminal device 300 as the call response message is transmitted to the first user terminal device 100. When the session for call negotiation is connected, the second user terminal device 300 transmits the voice data through the first bandwidth based on the communication configuration information included in the call request message received from the first user terminal device 100 (S230). Here, the first bandwidth is a communication method that may be supported by the satellite device 200 communicatively coupled to the first user terminal device 100. Accordingly, the first user terminal device 100 transmits the voice data received from the second user terminal device 300 to the satellite device 200 without modulating the communication method that may be supported by the satellite device 200 (S235).

On the other hand, in step S235, the satellite device 200 may transmit voice data of a user's uttered voice to the first user terminal device 100 through the first bandwidth. When the voice data is received from the satellite device 200, the first user terminal device 100 amplifies the voice data received from the satellite device 200 based on the communication configuration information previously generated through step S215 described above, and transmits the amplified voice data to the second user terminal device 300 through the second bandwidth (S240).

The first and second user terminal devices 100 and 300 may repeat steps S230 to S240 described above until a session connection for call negotiation is released. On the other hand, when the first user terminal device 100 receives an event occurrence message from the second user terminal device 300, the first user terminal device 100 transmits the voice data to the second user terminal device 300 through a bandwidth corresponding to a communication method requested by the second user terminal device 300 based on the communication configuration information included in the received event occurrence message (S245, S250).

For example, the second user terminal device 300 may be connected to an earphone using a short-range communication method in a state where the session for call negotiation is connected between the second user terminal device 300 and the first user terminal device 100 and the second user terminal device 300 transmits and receives voice data to and from the first user terminal device 100. In this case, the second user terminal device 300 determines communication configuration information for receiving the voice data using a communication method that may be supported by the earphone based on state information of the earphone communicatively connected to the second user terminal device 300, generates an event occurrence message including the determined communication configuration information, and transmits the generated event occurrence message to the first user terminal device 100.

For example, the earphone communicatively connected to the second user terminal device 300 may communicate with the second user terminal device 300 through communication configuration of the first bandwidth. In this case, the second user terminal device 300 determines the communication configuration information for receiving the voice data through the first bandwidth, generates the event occurrence message including the determined communication configuration information, and transmits the event occurrence message to the first user terminal device 100.

Accordingly, the first user terminal device 100 transmits the voice data received from the satellite device 200 communicatively connected to the first user terminal device 100 to the second user terminal device 300 through the first bandwidth based on the communication configuration information included in the received event occurrence message. That is, when the satellite device 200 such as the smart watch or the earphone is connected to each of the first and second user terminal devices 100 and 300 to which the session for call negotiation is connected, the first and second user terminal devices 100 and 300 may transmit the voice data in consideration of the communication method that may be supported by the satellite device 200 connected to each of the first and second user terminal devices 100 and 300.

Figure 4:
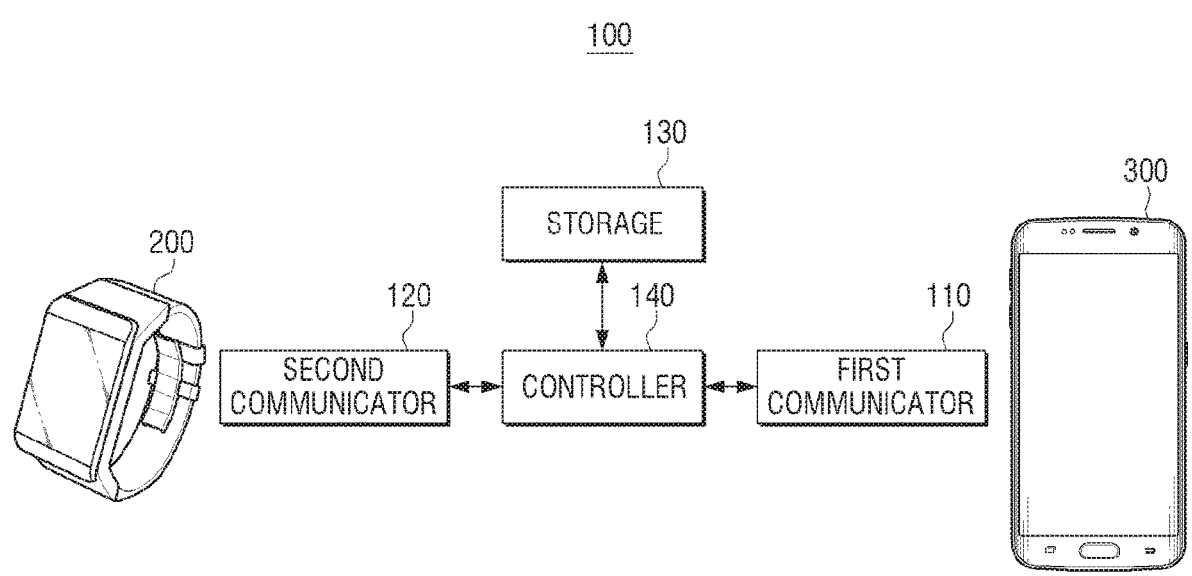
FIG. 4 is a block diagram of a user terminal device according to an exemplary embodiment of the present disclosure.

FIG. 4 is a block diagram of a user terminal device according to an exemplary embodiment of the present disclosure.

As shown in FIG. 4, the user terminal device (hereinafter referred to as first user terminal device) 100 includes first and second communicators 110 and 120, a storage 130, and a controller 140.

The first communicator 110 is a configuration for data communication using a wireless communication method with the other terminal device (hereinafter, referred to as the second user terminal device) 300 for call negotiation with the first user terminal device 100 or a content server (not shown) providing content. The second communicator 120 is a configuration for data communication using a short-range wireless communication method with the satellite device 200 which is a wearable device such as a smart watch, a wireless earphone, or a wireless headset, etc.

According to an exemplary embodiment, the first communicator 110 may be a mobile communication module connected to an external network according to a wireless communication protocol such as IEEE, etc. to perform communication or connected to a mobile communication network according to various communication methods such as 3G (3rd Generation), LTE (Long Term Evolution), etc. to perform communication.

Meanwhile, when the first communicator 110 provides an interface with various source devices such as USB 2.0, USB 3.0, HDMI, IEEE 1394, etc., the first communicator 110 may receive content data transmitted from an external server (not shown) connected through a wired cable connected to the first communicator 110, or transmit previously stored content data to an external recording medium. Also, the first communicator 110 may receive power from a power source through the wired cable physically connected to the first communicator 110.

The second communicator 120 may include at least one of a Bluetooth module, an infrared data association (IrDA) module, a near field communication (NFC) module, a WIFI module, and a Zigbee module.

The storage 130 may store satellite device information including at least one of state information of the satellite device 200 communicatively connected to the first user terminal device 100 through the second communicator 120 and identification information of the satellite device 200.

When a call request message is received from the second user terminal device 300 through the first communicator 110, the controller 140 controls the first communicator 110 to generate a call response message including communication configuration information for call negotiation with the second user terminal device 300 and transmit the generated call response message to the second user terminal device 300. In addition, the controller 140 controls the first communicator 110 to transmit a call request message to the second user terminal device 300 according to a user request, and, when the call response message is received from the second user terminal device 300 through the first communicator 110, performs a session connection for call negotiation with the second user terminal device 300 based on the communication configuration information included in the received call response message.

When the call request message is received from the second user terminal device 300, the controller 140 determines a communication connection state between the first user terminal device 100 and the satellite device 200. As described above, when communication between the first user terminal device 100 and the satellite device 200 is connected, the storage 130 may store the satellite device information including the state information and the identification information of the satellite device 200 communicatively coupled to the first user terminal device 100.

Therefore, the controller 140 may determine whether communication between the at least one satellite device 200 and the first user terminal device 100 is connected based on the state information included in the satellite device information stored in the storage 130. When it is determined that communication is connected between the first user terminal device 100 and the satellite device 200, the controller 140 determines communication configuration information for call negotiation with the second user terminal device 300 based on the pre-stored state information of the satellite device 200 and a communication method of the first user terminal device 100, and generates a call response message including the determined communication configuration information. Here, the communication configuration information may include at least one of identification information of the first user terminal device 100, bandwidth information for transmitting and receiving voice data, bit rate, and channel information. When the call response message including the communication configuration information is generated, the controller 140 controls the first communicator 110 to transmit the call response message including the communication configuration information. Accordingly, the first communicator 110 transmits the call response message including the communication configuration information to the second user terminal device 300.

Accordingly, when a session for call negotiation between the first and second user terminal devices 100 and 300 is connected, the first communicator 110 receives voice data from the second user terminal device 300 using a communication method included in the communication configuration information according to a control instruction of the controller 140.

Specifically, when the call request message is received from the second user terminal device 300, the controller 140 determines a communication method of the satellite terminal 200 based on the state information of the satellite terminal device 200 communicatively connected to the first user terminal device 100. As a result of determination, when it is determined that the satellite device 200 is communicating with the first user terminal device 100 through a communication configuration of a first bandwidth, the controller 140 generates a call response message including communication configuration information for transmitting voice data in the first bandwidth and transmits the generated call response message to the second user terminal device 300 through the first communicator 110.

Thereafter, when a session for call negotiation between the first and second user terminal devices 100 and 300 is connected, the second user terminal device 300 transmits the voice data through the first bandwidth based on the communication configuration information included in the call response message received from the first user terminal device 100. Accordingly, the first communicator 110 may receive the voice data transmitted through the first bandwidth from the second user terminal device 300, and the controller 140 may transmit the voice data transmitted through the first bandwidth to the satellite device 200 through the second communicator 120 without further modulation.

Meanwhile, the call request message received from the second user terminal device 300 may include the communication configuration information. When communication is requested through a second bandwidth greater than the first bandwidth through the communication configuration information included in the received call request message, the controller 140 generates a call response message further including the communication configuration information for receiving the voice data in the second bandwidth from the second user terminal device 300 and transmits the call response message to the second user terminal device 300 through the first communicator 110.

Thereafter, when the session for call negotiation between the first and second user terminal devices 100 and 300 is connected, the second user terminal device 300 transmits the voice data through the first bandwidth based on the communication configuration information included in the call response message received from the first second user terminal device 100. Accordingly, the first communicator 110 may receive the voice data transmitted through the first bandwidth from the second user terminal device 300, and the controller 140 may transmit the voice data transmitted through the first bandwidth to the satellite device 200 through the second communicator 120 without further modulation.

On the other hand, when the voice data is received from the satellite device 200 communicatively connected to the first user terminal device 100 through the first bandwidth, the controller 140 amplifies a band of the voice data received through the first bandwidth based on the communication configuration information included in the call response message. Then, the controller 140 controls the first communicator 110 to transmit the amplified voice data to the second user terminal device 300 through the second bandwidth. Accordingly, the first communicator 110 may transmit the voice data to the second user terminal device 300 through the second bandwidth.

That is, the first communicator 110 may receive the voice data transmitted from the second user terminal device 300 through the first bandwidth and transmit the voice data to the second user terminal device 300 through the second bandwidth greater than the first bandwidth.

For example, the satellite device 200 communicably connected to the first user terminal device 100 may transmit and receive the voice data to and from the first user terminal device 100 in a bandwidth of a narrow band (NB). In this case, the satellite device 200 may transmit the satellite device information including the state information for transmitting and receiving the voice data and the identification information of the satellite device 200 to the first user terminal device 100 through the bandwidth of the NB.

The second user terminal device 300 may transmit a call request message including communication configuration information for receiving the voice data in a bandwidth of a super wide band (SWB).

In this case, the controller 140 receives the voice data through the bandwidth of the NB based on the state information of the satellite device 200 and the communication configuration information included in the call request message received from the second user terminal device 300, generates a call response message including the communication configuration information for transmitting the voice data through the bandwidth of the SWB, and transmits the call response message to the second user terminal device 300.

Accordingly, when the session for call negotiation between the first and second user terminal devices 100 and 300 is connected, the second user terminal device 300 may transmit the voice data to the first user terminal device 100 through the bandwidth of the NB, and the first user terminal device 100 may amplify the band of the voice data received from the satellite device 200 communicatively coupled to the first user terminal device 100 and transmit the voice data to the second user terminal device 300 through the bandwidth of the SWB.

In another example, the satellite device 200 communicably connected to the first user terminal device 100 may transmit and receive the voice data to and from the first user terminal device 100 the bandwidth of the NB, and the first user terminal device 100 may transmit and receive the voice data to and from the second user terminal device 300 in the bandwidth of the SWB.

In this case, the controller 140 receives the voice data through the bandwidth of the NB based on the state information of the satellite device 200 and the communication method of the first user terminal device 100, generates the call response message including the communication configuration information for transmitting the voice data through the bandwidth of the SWB, and transmits the voice data to the second user terminal device 300.

Accordingly, when the session for call negotiation between the first and second user terminal devices 100 and 300 is connected, the second user terminal device 300 may transmit the voice data to the first user terminal device 100 through the bandwidth of the NB, and the first user terminal device 100 may amplify a band of the voice data received from the satellite device 200 communicatively connected to the first user terminal device 100 and transmit the voice data to the second user terminal device 300 through the bandwidth of the SWB.

Meanwhile, when the controller 140 requests communication through the second bandwidth greater than the first bandwidth with respect to the call request message received from the second user terminal device 300, the controller 140 generates a call response message including communication configuration information for receiving the voice data in the first bandwidth from the second user terminal device 300, and transmits the generated call response message to the second user terminal device 300.

Thereafter, when the session for call negotiation between the first and second user terminal devices 100 and 300 is connected, the second user terminal device 300 transmits the voice data through the first bandwidth based on the communication configuration information included in the call response message received from the first user terminal device 100. Accordingly, the first communicator 110 may receive the voice data transmitted through the first bandwidth from the second user terminal device 300, and the controller 140 may transmit the voice data transmitted through the first bandwidth to the satellite device 200 through the second communicator 120 without further modulation.

On the other hand, when the voice data is received from the satellite device 200 through the second communicator 120, the controller 140 may transmit the voice data received from the satellite device 200 to the second user terminal device 300 through the first bandwidth without further modulation based on the communication configuration information included in the call response message.

For example, the satellite device 200 communicably connected to the first user terminal device 100 may transmit and receive the voice data to and from the first user terminal device 100 in a wide band (WB). In this case, the satellite device 200 may transmit the satellite device information including the state information for transmitting and receiving the voice data and the identification information of the satellite device 200 to the first user terminal device 100 through a bandwidth of the WB. The first user terminal device 100 may transmit and receive the voice data through the bandwidth of the WB.

Meanwhile, the second user terminal device 300 may transmit a call request message including communication configuration information for receiving the voice data through the bandwidth of the SWB.

In this case, the first user terminal device 100 may generate a call response message including the communication configuration information for transmitting and receiving the voice data through the bandwidth of the WB based on the state information of the satellite device 200 communicatively coupled to the first user terminal device 100 and the communication method of the first user terminal device 100 and transmit the call response message to the second user terminal device 300.

Accordingly, when the session for call negotiation between the first and second user terminal devices 100 and 300 is connected, the first and second user terminal devices 100 and 300 may transmit and receive the voice data through the bandwidth of the WB based on the communication configuration information included in the call response message.

Meanwhile, when the session for call negotiation with the second user terminal device 300 is connected, the controller 140 determines whether a communication connection with the satellite device 200 communicatively connected to the first user terminal device 100 is released. As a result of determination, when it is determined that the communication connection with the first user terminal device 100 is released, the controller 140 generates a event occurrence message including communication configuration information for transmitting and receiving the voice data in the second bandwidth between the first and second user terminal devices 100 and 300 and transmits the generated event occurrence message to the second user terminal device 300.

Accordingly, the second user terminal device 300 transmits the voice data in the second bandwidth based on the communication configuration information included in the event occurrence message received from the first user terminal device 100. Accordingly, the first communicator 110 may receive the voice data from the second user terminal device 300 through the second bandwidth after transmitting the event occurrence message.

As described above, after the session for call negotiation between the first and second user terminal devices 100 and 300 is connected, the first user terminal device 100 may receive the voice data from the second user terminal device 300 through the first bandwidth that may be supported by the satellite device 200 communicatively connected to the first user terminal device 100 based on the communication configuration information included in the call response message, modulate the voice data received from the satellite device 200, and transmit the voice data to the second user terminal device 300 through the second bandwidth requested by the second user terminal device 300.

In this regard, when the session for call negotiation with the second user terminal device 300 is connected, the first user terminal device 100 periodically checks a connection state of the satellite device 200 and determines whether the communication connection with the satellite device 200 is maintained. As a result of determination, when it is determined that the communication connection is released, the first user terminal device 100 determines communication configuration information for transmitting and receiving the voice data through the second bandwidth supported by the first user terminal device 100, generates an event occurrence message including the determined communication configuration information, and transmits the event occurrence message to the second user terminal device 300.

Therefore, the first and second user terminal devices 100 and 300 may transmit and receive the voice data through the second bandwidth based on the communication configuration information included in the event occurrence message.

Meanwhile, when communication between the first user terminal device 100 and the satellite device 200 is connected in a state where the controller 140 transmits and receives the voice data to and from the second user terminal device 300 through the second bandwidth, the controller 140 generates an event occurrence message including communication configuration information for transmitting the voice data in the first bandwidth from the second user terminal device 300 and transmits the event occurrence message to the second user terminal device 300. Accordingly, the second user terminal device 300 may transmit the voice data to the first user terminal device 100 through the first bandwidth based on the communication configuration information included in the event occurrence message received from the first user terminal device 100. Accordingly, after transmitting the event occurrence message to the second user terminal device 300, the first communicator 110 may receive the voice data from the second user terminal device 300 through the first bandwidth.

Meanwhile, when a call request message is transmitted to the second user terminal device 300 according to a user request, the controller 140 may receive a call response message including the communication configuration information from the second user terminal device 300.

When the second user terminal device 300 is communicatively connected to the satellite device 200, the second user terminal device 300 may generate the call response message including the state information of the satellite device 200 communicatively connected to the second user terminal device 300 and the communication configuration information determined based on the communication method that may be supported by the second user terminal device 300 and transmit the generated call response message to the first user terminal device 100.

When the call response message is received, the controller 140 controls the first communicator 110 to transmit the voice data to the second user terminal device 300 using a communication method corresponding to the communication configuration information included in the received call response message. Accordingly, the first communicator 110 may transmit the voice data using the communication method corresponding to the communication configuration information included in the call response message.

Specifically, when it is determined that the second user terminal device 300 has requested communication in the first bandwidth based on the communication configuration information included in the received call response message, the controller 140 controls the first communicator 110 to transmit the voice data to the second user terminal device 300 through the first bandwidth. Accordingly, the first communicator 110 may transmit the voice data to the second user terminal device 300 through the first bandwidth.

For example, the satellite device 200 communicatively connected to the second user terminal device 300 may transmit and receive the voice data through the bandwidth of the WB. In this case, the satellite device 200 may transmit the satellite device information including the state information for transmitting and receiving the voice data and the identification information of the satellite device 200 to the second user terminal device 300 through the bandwidth of the WB.

The second user terminal device 300 may receive a call request message including communication configuration information for transmitting the voice data in the bandwidth of the SWB from the first user terminal device 100.

In this case, the second user terminal device 300 may receive the voice data through the bandwidth of the WB based on the state information included in the satellite device information of the satellite device 200 communicatively connected to the second user terminal device 300 and the communication configuration information included in the call request message received from the first user terminal device 100, generates a call response message including the communication configuration information for transmitting the voice data in the bandwidth of the SWB, and transmits the call response message to the first user terminal device 100.

Accordingly, when the session for call negotiation between the first and second user terminal devices 100 and 300 is connected, the first communicator 110 may transmit the voice data through the bandwidth of the WB based on the communication configuration information included in the call response message according to a control instruction of the controller 140 and receive the voice data through the bandwidth of the SWB from the second user terminal device 300.

Meanwhile, the first user terminal device 100 may be communicatively connected to the satellite device 200. In this case, when the voice data is received from the second user terminal device 300, the controller 140 controls the second communicator 120 to transmit the voice data through a bandwidth of the communication method that may be supported by the satellite device 200 based on the pre-stored state information of the satellite device 200 in the storage 130. Accordingly, the second communicator 120 may transmit the voice data received from the second user terminal device 300 through a bandwidth that may be communicated by the satellite device 200 communicatively connected to the first user terminal device 100.

For example, the satellite device 200 communicably connected to the first user terminal device 100 may transmit and receive the voice data through the bandwidth of the WB, and the second user terminal device 300 may transmit the voice data to the first user terminal device 100 through the bandwidth of the SWB based on the communication configuration information included in the call response message.

Therefore, when the voice data is received from the second user terminal device 300 through the bandwidth of the SWB, the controller 140 may downwardly adjust a bandwidth of the received voice data to the bandwidth of the WB and transmit the voice data to the satellite device 200.

Meanwhile, when the voice data is received from the satellite device 200 communicatively connected to the first user terminal device 100 through the second bandwidth greater than the first bandwidth, the controller 140 controls the first communicator 110 to transmit the voice data to the second user terminal device 300 through the first bandwidth based on the communication configuration information included in the call response message. Accordingly, the first communicator 110 may transmit the voice data to the second user terminal device 300 through the first bandwidth.

For example, the call response message received from the second user terminal device 300 may include communication configuration information for requesting reception of the voice data through the bandwidth of the NB. The satellite device 200 communicatively connected to the first user terminal device 100 may transmit and receive the voice data through the bandwidth of the WB. Accordingly, when the voice data is received from the satellite device 200 communicatively connected to the first user terminal device 100 through the bandwidth of the WB, the controller 140 controls the first communicator 110 to downwardly adjust a bandwidth of the voice data received through the bandwidth of the WB to the bandwidth of the NB based on the communication configuration information included in the call response message and transmit the voice data to the second user terminal device 300. Accordingly, the first communicator 110 may transmit the voice data to the second user terminal device 300 through the bandwidth of the NB.

However, the present disclosure is not limited thereto, and when each of the first and second user terminal devices 100 and 300 is communicatively connected to the satellite device 200, the controller 140 determines the communication configuration information based on the state information of the satellite device 200 communicatively connected to the first user terminal device 100 and a communication method that may be supported by the first user terminal device 100, and transmits a call request message including the determined communication configuration information. The second user terminal device 300 that received the call request message determines communication configuration information for transmitting and receiving the voice data based on the state information of the satellite device 200 communicatively connected to the second user terminal device 300 and the communication configuration information included in the call request message and transmits a call response message including the determined communication configuration information to the first user terminal device 100.

For example, the satellite device 200 communicably connected to the first user terminal device 100 may transmit and receive the voice data through the bandwidth of the NB, and the first user terminal device 100 may transmit and receive the voice data through the bandwidth of the SWB. In this case, the controller 140 may receive the voice data in the bandwidth of the NB and transmit a call request message including the communication configuration information for transmitting the voice data to the second user terminal device 300 through the bandwidth of the SWB.

Meanwhile, the satellite device 200 communicatively connected to the second user terminal device 300 may transmit and receive the voice data through the bandwidth of the WB, and the second user terminal device 300 may transmit and receive the voice data through the bandwidth of the SWB. In this case, the second user terminal device 300 may transmit a call response message including the communication configuration information for receiving the voice data to the first user terminal device 300 in the bandwidth of the WB.

Thereafter, when the session for call negotiation between the first and second user terminal devices 100 and 300 is connected, the first user terminal device 100 transmits the voice data to the second user terminal device 300 through the bandwidth of the WB based on the communication configuration information included in the call response message. Accordingly, when voice data is received through the bandwidth of the WB, the second user terminal device 300 may transmit the received voice data to the satellite device 200 communicatively connected to the second user terminal device 300 without further modulation.

Meanwhile, the second user terminal device 300 transmits the voice data to the first user terminal device 100 through the bandwidth of the NB based on the communication configuration information included in the call request message. Accordingly, when the voice data is received through the bandwidth of the NB, the first user terminal device 100 may transmit the received voice data to the satellite device 200 communicatively connected to the first user terminal device 100 without further modulation.

Meanwhile, when the controller 140 receives the event occurrence message from the second user terminal device 300, the controller 140 controls the first communicator 110 to transmit the voice data in a bandwidth requested by the second user terminal device 300 according to the communication configuration information included in the received event occurrence message. Accordingly, the first communicator 110 may transmit the voice data through the bandwidth requested by the second user terminal device 300.

Figure 6:
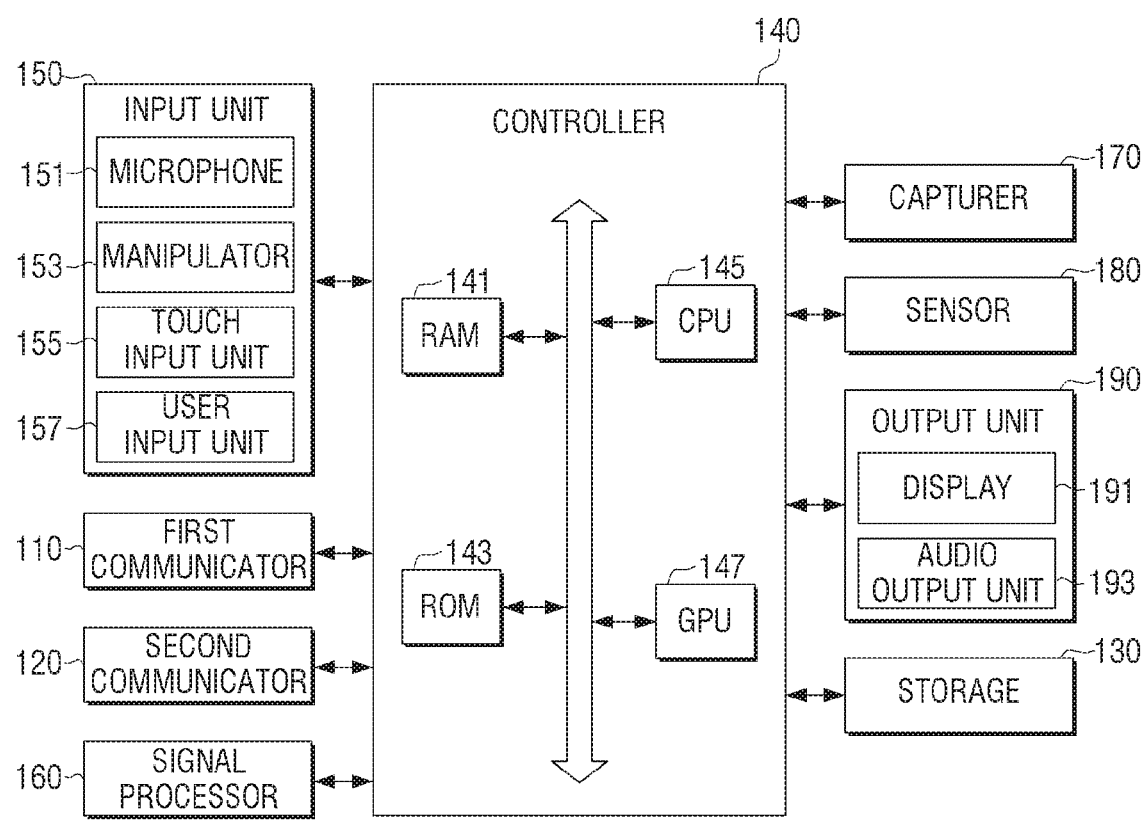
FIG. 6 is a detailed block diagram of a user terminal device according to an exemplary embodiment of the present disclosure.

Meanwhile, the controller 140 may perform call negotiation for transmitting and receiving the voice data to and from the second user terminal device 300 by using a program stored in the storage 130, as shown in FIG. 6.

Figure 5:
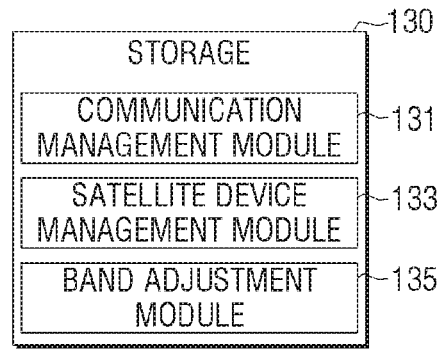
FIG. 5 is a block diagram illustrating a configuration of a storage according to an exemplary embodiment of the present disclosure.

FIG. 5 is a block diagram illustrating a configuration of a storage according to an exemplary embodiment of the present disclosure.

As described above, the storage 130 may store satellite device information including at least one of state information of the satellite device 200 communicatively connected to the first user terminal device 100 through the second communicator 120 and identification information of the satellite device 200.

In addition, as shown in FIG. 2, the storage 130 may include a communication management module 131, a satellite device management module 133, and a band adjustment module 135.

Here, the communication management module 131 is a module for establishing communication with the second user terminal device 300 to which a session for call negotiation is connected.

Accordingly, the controller 140 may determine communication configuration information for transmitting and receiving voice data between the first user terminal device 100 and the second user terminal device 300 based on the communication management module 131 stored in the storage 130 and generate a call request message or a call response message including the determined communication configuration information.

The satellite device management module 133 is a module storing satellite device information including state information about a communication method that may be supported by the satellite device 200 communicatively connected to the first user terminal device 100 and identification information of the satellite device 200 and managing a connection state of the communicatively connected satellite device 200.

Accordingly, when the session for call negotiation with the second user terminal device 300 is connected, the controller 140 may periodically identify the connection state of the satellite device 200 communicatively connected to the first user terminal device 100 using the satellite device management module 133 stored in the storage 130.

The band adjustment module 135 is a module for transmitting the voice data in a bandwidth corresponding to a communication method that may be supported by the satellite device 200 communicatively connected to the first user terminal device 100 or transmitting the voice data in a bandwidth requested by the second user terminal device 300 to which the session for call negotiation is connected.

Therefore, the controller 140 may adjust a band corresponding to the bandwidth requested by the second user terminal device 300 based on the communication configuration information included in the call request message or the call response message and transmit the voice data to the second user terminal device 300.

Meanwhile, the first user terminal device 100 described above may further include various other configurations than the first and second communicators 110 and 120, the storage 130, and the controller 140.

According to an exemplary embodiment, when the first user terminal device 100 is implemented as a display device such as a smart phone or a tablet PC, the input unit 150, the signal processor 160, a capturer 170, a sensor 180, and an output unit 190 may be further provided as shown in FIG. 6.

FIG. 6 is a detailed block diagram of a user terminal device according to an exemplary embodiment of the present disclosure.

The input unit 150 may include a microphone 151, a manipulator 153, a touch input unit 155, and a user input unit 157. The microphone 151 may receive an audio signal of a user's uttered voice. The manipulator 153 may be implemented as a key pad having various function keys, numeric keys, special keys, and character keys. The touch input unit 155 may be implemented as a touch pad having a mutual layer structure with the display 191 when the display 191 that will be described later is implemented as a touch screen. In this case, the touch input unit 155 may receive a selection instruction with respect to various application-related icons displayed through the display 191.

The user input unit 157 may receive an IR signal or an RF signal for controlling an operation of the first user terminal device 100 from at least one peripheral device (not shown) such as a remote control device.

The signal processor 160 may be a component for processing image data and audio data of content received from the first or second communicator 110 or 120 or content stored in the storage 130 according to a control instruction of the controller 140. Specifically, the signal processor 160 may perform various image processing such as decoding, scaling, noise filtering, frame rate conversion, and resolution conversion on the image data included in the content. The signal processor 160 may also perform various audio signal processing such as decoding, amplification, noise filtering, and the like on the audio data included in the content.

In addition, the signal processor 160 may compress an audio signal of an uttered voice input through the microphone 151 through a vocoder or perform reconstruction processing on compressed speech data.

The capturer 170 is to capture a still image or a moving image according to a user instruction, and may be implemented as a plurality of cameras such as a front camera and a rear camera.

The sensor 180 senses various operation states and user interactions of the first user terminal device 100. In particular, the sensor 180 may sense a holding state of a user holding the first user terminal device 100. Specifically, the first user terminal device 100 may rotate or may be inclined in various directions. At this time, the sensor 180 may use at least one of various sensors such as a geomagnetic sensor, a gyro sensor, an acceleration sensor, and the like to sense an inclination of the first user terminal device 100 held by the user with respect to a rotation motion or a gravity direction.

The output unit 190 outputs at least one of video data and audio data on which signal processing is performed through the signal processor 160. The output unit 190 may include the display 191 and an audio output unit 193. The display 191 may display the image data on which image processing is performed by the signal processor 160. The audio output unit 193 may output audio data on which audio signal processing is performed in the form of an audible sound.

Meanwhile, the display 191 displaying the image data may be implemented as a liquid crystal display (LCD), an organic light emitting diode (OLED) or a plasma display panel (PDP), or the like. In particular, the display 191 may be implemented as a touch screen having a mutual layer structure together with the touch input unit 155 described above.

Meanwhile, the controller 140 may include a RAM 141, a ROM 143, a CPU 145 and a GPU 147. The RAM 141, the ROM 143, the CPU 145 and the GPU 147 may be interconnected via a bus.

The CPU 145 accesses the storage 130 and performs booting using an OS stored in the storage 130. The CPU 145 also performs various operations using various programs, contents, data, and the like stored in the storage 130.

The ROM 143 stores a command set for booting the system and the like. When a turn-on instruction is input and power is supplied, the CPU 145 copies the OS stored in the storage 130 to the RAM 141 according to the instruction stored in the ROM 143 and executes the OS to boot the system. When booting is completed, the CPU 145 copies various programs stored in the storage 130 to the RAM 141, executes the programs copied to the RAM 141, and performs various operations.

The GPU 147 generates a display screen including various objects such as icons, images, text, and the like. Specifically, the GPU 147 computes attribute values such as a coordinate value, a shape, a size, and a color to be displayed by each object according to a layout of the screen based on the received control instruction, and generates the display screen of various layouts including the display screen based on the computed attribute values.

The controller 140 may be combined with various configurations such as the input unit 150, the first and second communicators 110 and 120, the signal processor 160, and the sensor 180 described above and implemented as a system-on-a-chip (SOC) or a system on chip (SoC).

Meanwhile, the operation of the controller 140 described above may be performed by the program stored in the storage 130. Here, the storage 130 may be implemented as at least one of the ROM 143, the RAM 141, or a memory card (e.g., an SD card, a memory stick) detachably mountable to the first user terminal device 100, a nonvolatile memory, a volatile memory, a hard disk drive (HDD), and a solid state drive (SSD).

Up to now, each configuration of the first user terminal device 100 according to the present disclosure has been described in detail. Hereinafter, a process of establishing a session connection for call negotiation between the first and second user terminal devices 100 and 300 according to the present disclosure will be described in detail.

Figure 7:
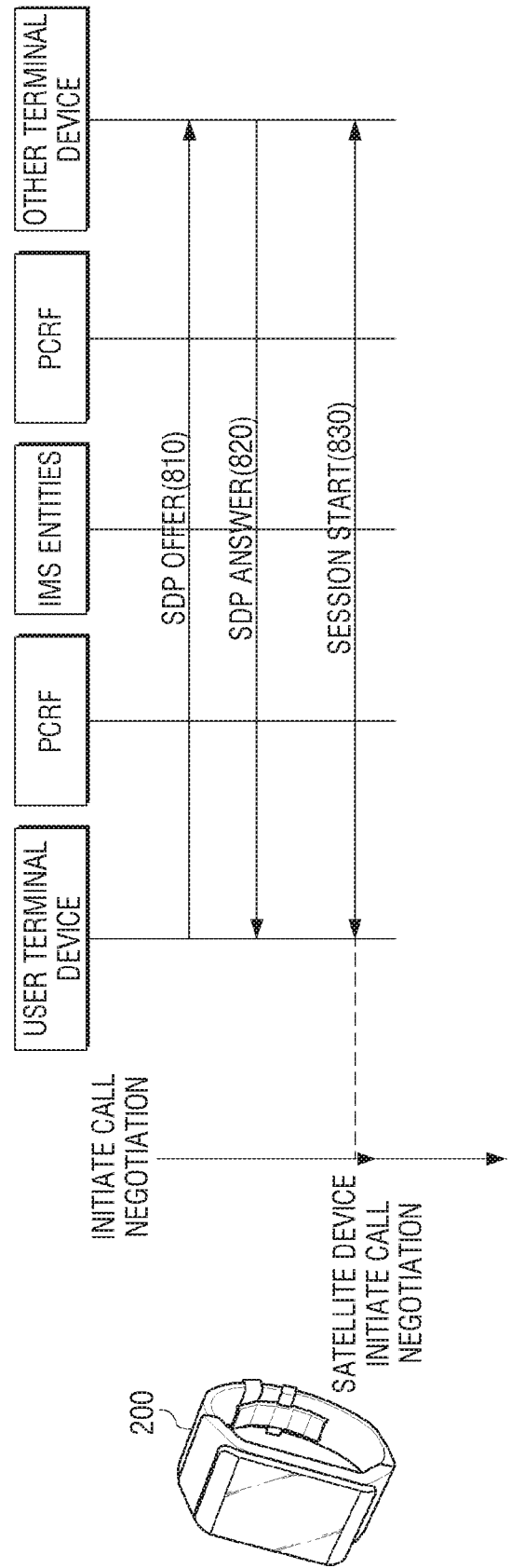
FIG. 7 is a diagram illustrating a process of performing a session connection for call negotiation between general user terminal devices.

FIG. 7 is a diagram illustrating a process of performing a session connection for call negotiation between general user terminal devices.

As shown in FIG. 7, a user terminal device (hereinafter, referred to as the first user terminal device) 100 communicatively connected to a conventional satellite device 200 transmits a SDP offer to the other terminal device (hereinafter referred to as the second terminal device) 300 (810) according to a user request. The second user terminal device 300 receiving the SDP offer transmits an SDP answer to the first user terminal device 100 that has transmitted the SDP offer (820).

That is, in response to a user request, the first user terminal device 100 generates a call request message including communication configuration information about a communication method that may be supported by the first user terminal device 100 and transmits the call request message to the second user terminal device 300.

For example, when a bandwidth available in the first user terminal device 100 is a bandwidth of a SWB and a bit rate is 24.4 kbps, the first user terminal device 100 determines the communication configuration information including "br=5.9-24.4; bw=nb-swb", and transmits the call request message including the determined communication configuration information to the second user terminal device 300. The second user terminal device 300 that receives the call request message transmits a call response message to the first user terminal device 100.

Accordingly, when a session for call negotiation between the first and second user terminal devices 100 and 300 is connected (830), the first user terminal device 100 initiates call negotiation with the satellite device 200 communicatively connected to the first user terminal device 100.

Accordingly, the first user terminal device 100 communicatively connected to the satellite apparatus 200 may transmit and receive voice data to and from the second user terminal device 300 to which the session for call negotiation with the first user terminal device 100 is connected.

Figure 8:
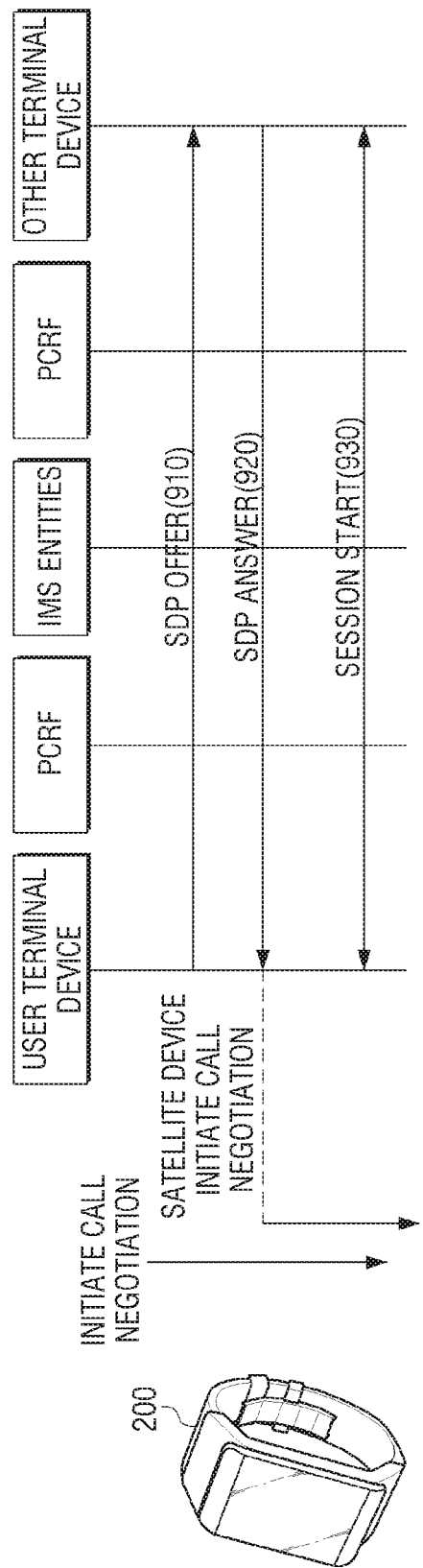
FIG. 8 is a diagram illustrating a process of performing a session connection for call negotiation between user terminal devices according to an exemplary embodiment of the present disclosure.

FIG. 8 is a diagram illustrating a process of performing a session connection for call negotiation between user terminal devices according to an exemplary embodiment of the present disclosure.

As shown in FIG. 8, a user terminal device (hereinafter, referred to as the first user terminal device) 100 connected to the satellite device 200 transmits a SDP offer to the other terminal device (hereinafter, referred to as the second user terminal device) 300 according to a user request (910). The second user terminal device 300 that received the SDP offer transmits an SDP answer to the first user terminal device 100 that has transmitted the SDP offer (920).

That is, the first user terminal device 100 generates a call request message including communication configuration information about a communication method that may be supported by the first user terminal device 100 according to a user request, and transmits the call request message to the second user terminal device 300.

For example, when a bandwidth available in the satellite device 200 communicatively connected to the first user terminal device 100 is a bandwidth of a WB, a bit rate is 9.6 kbps, a bandwidth available in the first user terminal device 100 is a bandwidth of a SWB, and a bit rate is 24.4 kbps, the first user terminal device 100 determines the communication configuration information including 'br-send=5.9-24.4; br-recv=5.9-9.6; bw-send=nb-swb; bw-recv=nb-wb', and transmits a call request message including the determined communication configuration information to the second user terminal device 300. The second user terminal device 300 that received the call request message transmits a call response message to the first user terminal device 100.

When the call response message is received, the first user terminal device 100 initiates call negotiation with the satellite device 200 communicatively connected to the first user terminal device 100 and simultaneously performs the session connection for call negotiation with the second user terminal device 300 based on the received call response message (930).

Accordingly, the first user terminal device 100 communicatively connected to the satellite device 200 may transmit and receive voice data to and from the second user terminal device 300 to which the session for call negotiation with the first user terminal device 100 is connected.

That is, the first user terminal device 100 communicatively connected to the satellite device 200 according to the present disclosure initiates call negotiation with the satellite device 200 communicatively connected to the first user terminal device 100 at the time of receiving the call response message from the second user terminal device 300 that transmitted the call request message, and thus a call negotiation time may be reduced compared to the prior art, and a call cost may be reduced accordingly.

In addition, the first user terminal device 100 according to the present disclosure may also transmit the call request message to the second user terminal device 300 in consideration of a communication method of the satellite device 200 communicatively connected to the first user terminal device 100, thereby improving not only the problem of unnecessary waste of wireless communication resources but also the problem of an occurrence of degradation of a call quality.

Hereinafter, a method, performed by the first user terminal device 100, of transmitting and receiving voice data between the first user terminal device 100 and second user terminal device 300 according to the present disclosure will be described in detail.

Figure 9:
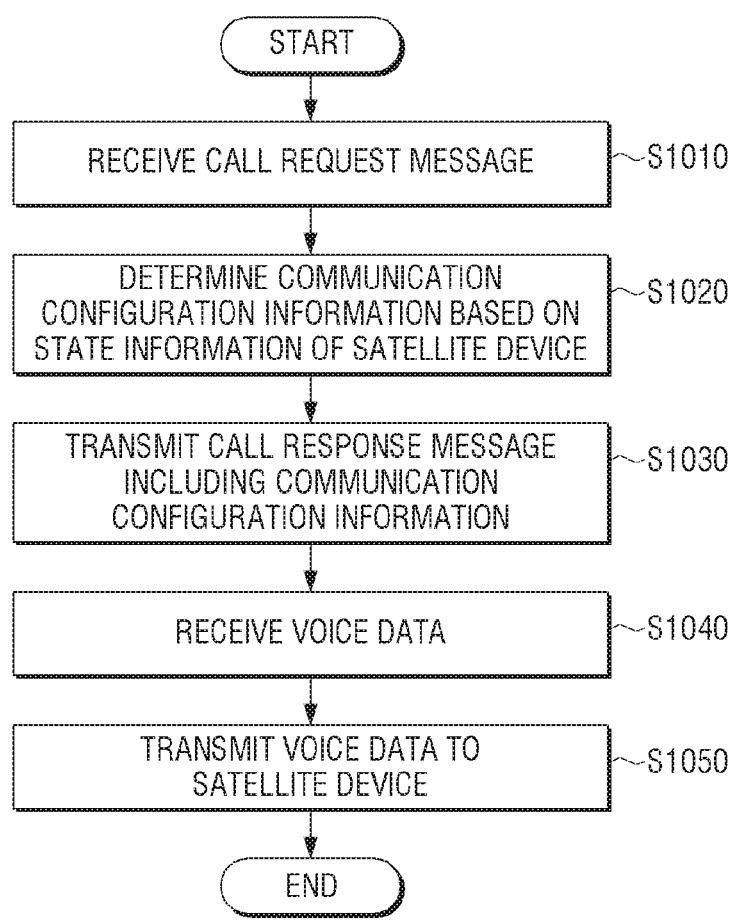
FIG. 9 is a first flowchart of performing a session connection for transmitting and receiving voice data between user terminal devices according to an exemplary embodiment of the present disclosure.

FIG. 9 is a first flowchart of performing a session connection for transmitting and receiving voice data between user terminal devices according to an exemplary embodiment of the present disclosure.

As illustrated in FIG. 9, a user terminal device (hereinafter referred to the first user terminal device) 100 may be communicatively connected to the satellite device 200 such as a smart watch using a short-range wireless communication method. In this way, in a state where the first user terminal device 100 is communicatively connected to the satellite device 200, when the first user terminal device 100 receives a call request message from the other terminal device (hereinafter referred to as the second called user terminal device) 300, the first user terminal device 100 determines communication configuration information with the second user terminal device 200 based on state information of the communicatively connected satellite device 200 (S1010, S1020). Thereafter, the first user terminal device 100 generates a call response message including the communication configuration information and transmits the generated call response message to the second user terminal device 300 (S1030).

Accordingly, when a session for call negotiation between the first and second user terminal devices 100 and 300 is connected, the second user terminal device 300 transmits voice data to the first user terminal device 100 based on a communication method corresponding to the communication configuration information included in the call response message transmitted from the first user terminal device 100.

Accordingly, when the voice data is received from the second user terminal device 300, the first user terminal device 100 transmits the voice data received from the second user terminal device 300 to the satellite device 200 communicatively connected to the first user terminal device 100 (S1040).

Specifically, when the first user terminal device 100 determines based on the state information of the satellite device 200 communicatively connected to the first user terminal device 100 that the satellite device 200 performs communication with the first user terminal device 100 through communication configuration of a first bandwidth, the first user terminal device 100 generates a call response message including the communication configuration information for transmitting the voice data in the first bandwidth in the second user terminal device 300 and transmits the call response message to the second user terminal device 300. Accordingly, the second user terminal device 300 may transmit the voice data through the first bandwidth based on the communication configuration information included in the call response message.

Accordingly, when the voice data is received through the first bandwidth from the second user terminal device 300, the first user terminal device 100 may transmit the voice data to the satellite device 200 without further modulation.

On the other hand, when a call request message including the communication configuration information is received from the second user terminal device 300, the first user terminal device 100 may transmit a call response message to the second user terminal device 300 based on the following embodiment.

According to an embodiment, when the call request message received from the second user terminal device 300 includes communication configuration information requesting communication through a second bandwidth greater than the first bandwidth, the first user terminal device 100 may transmit the call response message further including the communication configuration information for receiving the voice data through the second bandwidth to the second user terminal device 300.

Accordingly, when the voice data is received from the satellite device 200 communicatively connected to the first user terminal device 100 through the first bandwidth, the first user terminal device 100 amplifies a band of the voice data based on the communication configuration information included in the call response message. Then, the first user terminal device 100 transmits the amplified voice data to the second user terminal device 300.

According to another embodiment, when the call request message received from the second user terminal device 300 includes the communication configuration information requesting communication through the second bandwidth greater than the first bandwidth, the first user terminal device 100 may transmit a call response message further including communication configuration information for receiving the voice data from the second user terminal device 300 in the first bandwidth to the second user terminal device 300.

Accordingly, when the voice data is received through the first bandwidth from the satellite device 200 communicatively connected to the first user terminal device 100, the first user terminal device 100 may transmit the voice data received from the satellite device 200 to the second user terminal device 300 through the first bandwidth based on the communication configuration information included in the call response message.

Figure 10:
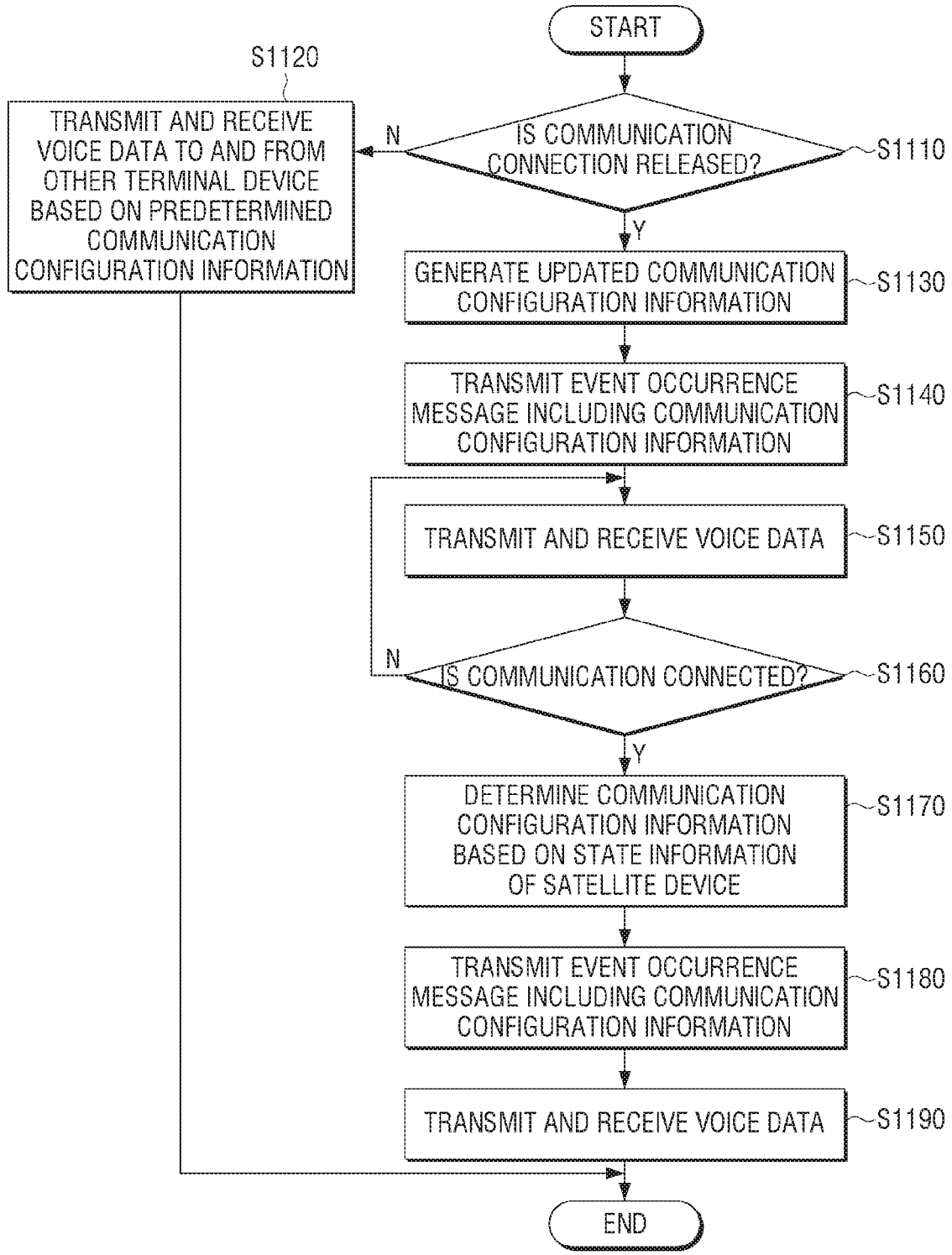
FIG. 10 is a flowchart for transmitting and receiving voice data to and from user terminal devices to which session is connected according to a communication state between a user terminal device and a satellite device according to an exemplary embodiment of the present disclosure.

FIG. 10 is a flowchart for transmitting and receiving voice data to and from user terminal devices to which session is connected according to a communication state between a user terminal device and a satellite device according to an exemplary embodiment of the present disclosure.

As described above, when a session for call negotiation with the second user terminal device 300 is connected, the first user terminal device 100 that transmits and receives the voice data to and from the second user terminal device 300 based on communication configuration information included in a call response message periodically determines whether a communication connection of the satellite device 200 communicatively connected to the first user terminal device 100 is released (S1110). When it is determined that the communication connection with the satellite device 200 is maintained as a result of determination, the first user terminal device 100 transmits and receives the voice data to and from the second user terminal device 300 based on the communication configuration information included in the call response message (S1120).

Meanwhile, when it is determined that the communication connection with the satellite device 200 is released, the first user terminal device 100 generates the updated communication configuration information, and transmits an event occurrence message including the generated communication configuration information to the second user terminal device 300 (S1130, S1140). After transmitting the event occurrence message, the first user terminal device 300 transmits and receives a response message to and from the second user terminal device 300 based on the communication configuration information included in the event occurrence message (S1150).

That is, when it is determined that the communication connection with the satellite device 200 communicatively connected to the first user terminal device 100 is released, the first user terminal device 100 generates the event occurrence message including communication configuration information for transmitting and receiving the voice data in a second bandwidth communicable in the first user terminal device 100, and transmits the event occurrence message to the second user terminal device 300. Therefore, after transmitting the event occurrence message to the second user terminal device 300, the first user terminal device 100 may transmit and receive the voice data to and from the second user terminal device 300 through the second bandwidth based on the communication configuration information included in the event occurrence message.

The first user terminal device 100 determines whether a communication connection between the first user terminal device 100 and the satellite device 200 is performed in a state where the first user terminal device 100 transmits and receives the voice data to and from the second user terminal device 300 through the second bandwidth (S1160). As a result of determination, when the communication connection is not performed, the first user terminal device 100 may transmit and receive the voice data to and from the second user terminal device 300 through the second bandwidth.

Meanwhile, when it is determined that communication is connected between the first user terminal device 100 and the satellite device 200, the first user terminal device 100 determines communication configuration information for requesting transmission of the voice data according to a communication method that may be supported by the satellite device 200 based on state information of the communicatively connected satellite device 200, generates an event occurrence message including the determined communication configuration information, and transmits the event occurrence message to the second user terminal device 300 (S1170, S1180). After transmitting the event occurrence message, the first user terminal device 100 transmits and receives the voice data to and from the second user terminal device 300 based on the communication configuration information included in the event occurrence message (S1190).

For example, the satellite device 200 communicatively connected to the first user terminal device 100 may transmit and receive the voice data through the first bandwidth. In this case, the first user terminal device 100 may receive the voice data through the first bandwidth, and transmits the event occurrence message including the communication configuration information for transmitting the voice data to the second user terminal device 300 through the second bandwidth to the second user terminal device 300.

Accordingly, the second user terminal device 300 may transmit the voice data through the first bandwidth to the first user terminal device 100 based on the communication configuration information included in the event occurrence message, and the first user terminal device 100 may transmit the voice data received from the second user terminal device 300 to the satellite device 200 communicably connected to the first user terminal device 100 without further modulation.

Meanwhile, when the voice data is received from the satellite device 200 communicatively connected to the first user terminal device 100 through the first bandwidth, the first user terminal device 100 may amplify the received voice data based on the communication configuration information included in the event occurrence message, and transmit the amplified voice data to the second user terminal device 300 through the second bandwidth.

Figure 11:
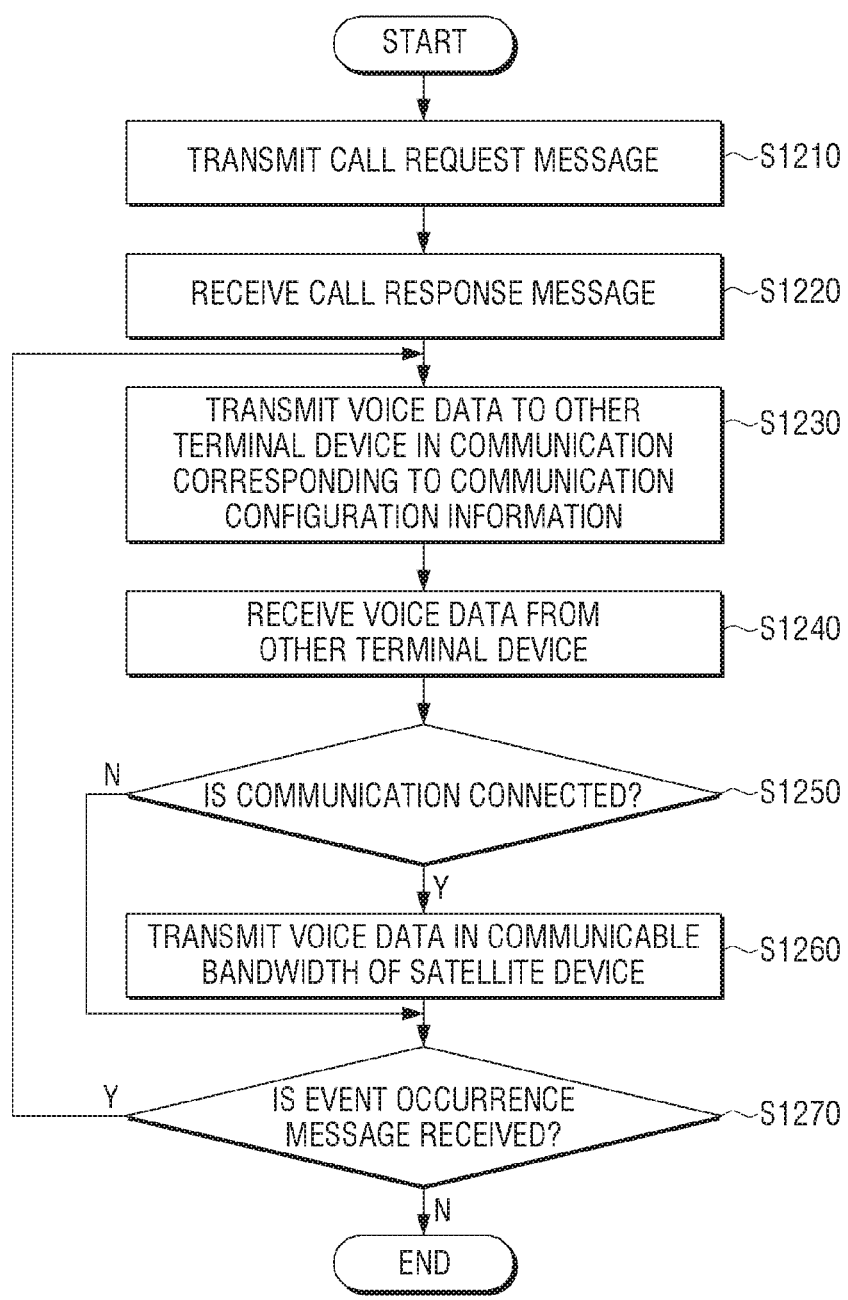
FIG. 11 is a second flowchart of performing a session connection for transmitting and receiving voice data between user terminal devices according to another exemplary embodiment of the present disclosure.

FIG. 11 is a second flowchart of performing a session connection for transmitting and receiving voice data between user terminal devices according to another exemplary embodiment of the present disclosure.

As shown in FIG. 11, a user terminal device (hereinafter referred to the first user terminal device) 100 transmits a call request message to the other terminal device (hereinafter referred to the second user terminal device) 300 (S1210) according to a user request. That is, the first user terminal device 100 generates a call request message including communication configuration information for receiving the voice data in a communication method supported by the first user terminal device 100, and transmits the call request message to the second user terminal device 300.

Thereafter, when a call response message is received from the second user terminal device 300 that has transmitted the call request message, the first user terminal device 100 transmits the voice data to the second user terminal device 300 using a communication method corresponding to the communication configuration information included in the received call response message (S1220, S1230).

Here, the second user terminal device 300 may be communicatively connected to the satellite device 200. In this case, the second user terminal device 300 may determine communication configuration information based on state information of the satellite device 200 communicatively connected to the second user terminal device 300 and the communication configuration information included in the call response message received from the first user terminal device 100, generate a call response message including the determined communication configuration information, and transmit the call response message to the first user terminal device 100.

Accordingly, the first and second user terminal devices 100 and 300 may transmit and receive the voice data through a bandwidth requested by the first and second user terminals 100 and 300 based on the communication configuration information included in the call response message.

That is, the communication configuration information included in the call response message may be configured to receive the voice data through a first bandwidth supported by the satellite device 200 communicatively connected to the second user terminal device 300 and transmit the voice data to the first user terminal device 100 through a second bandwidth greater than the first bandwidth.

In this case, the first user terminal device 100 may transmit the voice data to the second user terminal device 300 through the first bandwidth based on the communication configuration information included in the call response message, and the second user terminal device 300 may transmit the voice data to the first user terminal device 100 through the second bandwidth greater than the first bandwidth based on the communication configuration information included in the call response message.

When communication is connected between the first user terminal device 100 and the satellite device 200 in a state where the voice data is transmitted and received based on the communication configuration information, the first user terminal device 100 transmits the voice data received from the second user terminal device 300 to the satellite device 200 through a communicable bandwidth of the satellite device 200 based on the state information of the satellite device 200 communicatively connected to the first user terminal device 100 (S1260).

Meanwhile, when the voice data is received from the satellite device 200 communicatively connected to the first user terminal device 100 through the second bandwidth greater than the first bandwidth, the first user terminal device 100 may downwardly adjust a band of the voice data of the second bandwidth to the first bandwidth based on the communication configuration information included in the call response message and transmit the voice data to the second user terminal device 300 through the first bandwidth that was adjusted downwardly.

In a state where the voice data is transmitted and received between the first and second user terminal devices 100 and 300 based on the communication configuration information included in the call response message, when a connection of the satellite device 200 communicatively connected to the terminal device 300 is released, the second user terminal device 300 determines communication configuration information for transmitting and receiving the voice data using a communication method that may be supported by the first and second user terminal devices 100 and 300, and transmits an event occurrence message including the determined communication configuration information to the first user terminal device 100.

Accordingly, the first user terminal device 100 determines whether the event occurrence message is received from the second user terminal device 300 (S1270). As a result of determination, when the event occurrence message is received, the first user terminal device 100 may transmit and receive the voice data to and from the second user terminal device 200 through a communication method corresponding to the communication configuration information included in the received event occurrence message.

Meanwhile, the control method of the user terminal device 100 described above for transmitting and receiving voice data to and from the other terminal device 300 using a predetermined communication method may be implemented in at least one execution program. The execution program may be stored in a non-transitory computer readable medium.

The non-transitory readable medium is not a medium storing data for a short time such as a register, a cache, a memory, etc., but means a medium that semi-permanently stores data and may be read by a device. Specifically, the above-mentioned programs may be stored in various types of computer-readable recording media such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, a memory card, a USB memory, a CD-ROM, or the like.

The present disclosure has been described above with reference to the exemplary embodiments thereof.

While the present disclosure has been particularly shown and described with reference to the exemplary embodiments thereof, the present disclosure is not limited to the above-mentioned specific exemplary embodiments, but may be variously modified by those skilled in the art to which the present disclosure pertains without departing from the spirit and scope of the present disclosure as claimed in the claims. Such modifications should also be understood to fall within the scope of the present disclosure.

The invention claimed is:

1. A control method of a user terminal device comprising:
when a call request message is received from another terminal device, determining state information of a satellite device connected to the user terminal device;
determining communication configuration information with the other terminal device based on the state information of the satellite device and transmitting a call response message comprising the communication configuration information to the other terminal device; and
receiving voice data from the other terminal device using a communication method corresponding to the communication configuration information.

2. The control method as claimed in claim 1,
wherein the transmitting includes: when it is determined based on the state information of the satellite device that the satellite device performs communication with the user terminal device through a communication configuration of a first bandwidth, transmitting the call response message including communication configuration information for the other terminal device to transmit the voice data in the first bandwidth to the other terminal device, and
wherein the receiving includes: receiving the voice data from the other terminal device through the first bandwidth.

3. The control method as claimed in claim 2, wherein the transmitting further includes: when communication is requested through a second bandwidth greater than the first bandwidth to a call request message received from the other terminal device, transmitting the call response message further including communication configuration information for the other terminal device to receive the voice data in the second bandwidth to the other terminal device and transmitting the voice data to the other terminal device through the second bandwidth according to the communication configuration information.

4. The control method as claimed in claim 3, wherein the transmitting of the voice data includes:
receiving the voice data from the satellite device through the first bandwidth;
amplifying a band of the received voice data to the second bandwidth; and
transmitting the amplified voice data to the other terminal device through the second bandwidth.

5. The control method as claimed in claim 2, wherein the transmitting further includes: when communication is requested through a second bandwidth greater than the first bandwidth to a call request message received from the other terminal device, transmitting the call response message further including communication configuration information for the other terminal device to receive the voice data in the first bandwidth to the other terminal device and transmitting the voice data received from the satellite device to the other terminal device through the first bandwidth.

6. The control method as claimed in claim 3, further including:
determining a connection state between the user terminal device and the satellite device; and
when it is determined that a connection between the user terminal device and the satellite device is released, transmitting an event occurrence message including communication configuration information for the user terminal device and the other terminal device to transmit and receive the voice data in the second bandwidth to the other terminal device,
wherein the receiving includes: receiving the voice data from the other terminal device through the second bandwidth.

7. The control method as claimed in claim 6, wherein the transmitting of the event occurrence message includes: when the user terminal device and the satellite device are connected in a state where the voice data is transmitted and received to and from the other terminal device through the second bandwidth, transmitting the event occurrence message including communication configuration information for the other terminal device to transmit the voice data in the first bandwidth to the other terminal device, and
wherein the receiving includes: receiving the voice data from the other terminal device through the first bandwidth.

8. A user terminal device comprising:
a first communicator configured to perform data communication with another terminal device;
a second communicator configured to perform data communication with a satellite device connected to the user terminal device;
a storage configured to store state information of the satellite device; and
a controller configured to, when a call request message is received from the other terminal device through the first communicator, control the first communicator to determine communication configuration information of the other terminal device based on the state information of the satellite device stored in the storage, generate a call response message comprising the communication configuration information, and transmit the call response message to the other terminal device,
wherein the first communicator is configured to receive the voice data from the other terminal device in a communication method corresponding to the communication configuration information.

9. The user terminal device as claimed in claim 8,
wherein the controller is configured to, when it is determined based on the state information of the satellite device that the satellite device performs communication with the user terminal device through a communication configuration of a first bandwidth, generate the call response message including communication configuration information for the other terminal device to transmit the voice data in the first bandwidth to the other terminal device, and
wherein the first communicator is configured to receive the voice data from the other terminal device through the first bandwidth.

10. The user terminal device as claimed in claim 9, wherein the controller is configured to, when communication is requested through a second bandwidth greater than the first bandwidth to a call request message received from the other terminal device, control the first communicator to generate the call response message further including communication configuration information for the other terminal device to receive the voice data in the second bandwidth to the other terminal device and transmit the voice data to the other terminal device through the second bandwidth according to the communication configuration information.

11. The user terminal device as claimed in claim 10, wherein the controller is configured to, when the voice data is received from the satellite device through the first bandwidth, control the first communicator to amplify a band of the received voice data to the second bandwidth and transmit the amplified voice data to the other terminal device through the second bandwidth.

12. The user terminal device as claimed in claim 9, wherein the controller is configured to, when communication is requested through a second bandwidth greater than the first bandwidth to a call request message received from the other terminal device, control the first communicator to transmit the call response message further including communication configuration information for the other terminal device to receive the voice data in the first bandwidth to the other terminal device and, when the voice data is received from the satellite device, transmit the voice data to the other terminal device through the first bandwidth according to the communication configuration information.

13. The user terminal device as claimed in claim 10, wherein the controller is configured to, when it is determined that a connection between the user terminal device and the satellite device is released, control the first communicator to generate an event occurrence message including communication configuration information for the user terminal device and the other terminal device to transmit and receive the voice data in the second bandwidth and transmit the event occurrence message to the other terminal device, and wherein the first communicator is configured to receive the voice data from the other terminal device through the second bandwidth after transmitting the event occurrence message.

14. The user terminal device as claimed in claim 13, wherein the controller is configured to, when the user terminal device and the satellite device are connected in a state where the voice data is transmitted and received to and from the other terminal device through the second bandwidth, control the first communicator to transmit the event occurrence message including communication configuration information for the other terminal device to transmit the voice data in the first bandwidth to the other terminal device, and wherein the first communicator is configured to receive the voice data from the other terminal device through the first bandwidth after transmitting the event occurrence message.

* * * * *